(12) United States Patent
Oka

(10) Patent No.: US 8,860,253 B2
(45) Date of Patent: Oct. 14, 2014

(54) POWER CONTROL SYSTEM

(75) Inventor: Ryuji Oka, Tsukuba (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 14/112,100

(22) PCT Filed: Apr. 17, 2012

(86) PCT No.: PCT/JP2012/060351
§ 371 (c)(1),
(2), (4) Date: Oct. 16, 2013

(87) PCT Pub. No.: WO2012/144491
PCT Pub. Date: Oct. 26, 2012

(65) Prior Publication Data
US 2014/0035374 A1    Feb. 6, 2014

(30) Foreign Application Priority Data

Apr. 21, 2011    (JP) ................. 2011-094727

(51) Int. Cl.
*H02J 1/00*  (2006.01)
*H02J 3/00*  (2006.01)
*H02J 7/35*  (2006.01)
*H02J 3/46*  (2006.01)
*G06Q 50/06*  (2012.01)
*G06Q 30/02*  (2012.01)
*H02J 3/14*  (2006.01)

(52) U.S. Cl.
CPC .. *H02J 1/00* (2013.01); *Y02B 10/14* (2013.01); *H02J 2003/146* (2013.01); *Y04S 50/14* (2013.01); *H02J 3/00* (2013.01); *H02J 7/35* (2013.01); *H02J 3/46* (2013.01); *G06Q 50/06* (2013.01); *G06Q 30/0283* (2013.01)
USPC .......................................................... 307/80

(58) Field of Classification Search
USPC .................................... 307/52, 66, 80, 85, 86
See application file for complete search history.

(56) References Cited

U.S. PATENT DOCUMENTS

| 2003/0047209 A1 | 3/2003 | Yanai et al. |
| 2008/0052145 A1* | 2/2008 | Kaplan et al. ..................... 705/8 |
| 2009/0192655 A1 | 7/2009 | Ichikawa et al. |

FOREIGN PATENT DOCUMENTS

| CN | 101507075 | 8/2009 |
| JP | 6-14458 | 1/1994 |

(Continued)

OTHER PUBLICATIONS

Korean Office Action mailed Dec. 12, 2013, in corresponding Application No. 10-2013-7030477.

(Continued)

*Primary Examiner* — Carlos Amaya
(74) *Attorney, Agent, or Firm* — Wenderoth, Lind & Ponack, L.L.P.

(57) ABSTRACT

To provide a power control system which evaluates an applied control pattern over a period of a certain length or more, so as to be used for the subsequent control with a configuration in which a discharge start time and output of an electric storage device are changed.

20 Claims, 10 Drawing Sheets

(56) References Cited

FOREIGN PATENT DOCUMENTS

| | | |
|---|---|---|
| JP | 11-178237 | 7/1999 |
| JP | 2001-337116 | 12/2001 |
| JP | 2002-51481 | 2/2002 |
| JP | 2003-32912 | 1/2003 |
| JP | 2003-79054 | 3/2003 |
| JP | 2004-32989 | 1/2004 |
| JP | 2004-274981 | 9/2004 |
| JP | 2008-54439 | 3/2008 |
| JP | 2010-233362 | 10/2010 |
| JP | 2010-268602 | 11/2010 |
| JP | 2011-22902 | 2/2011 |

OTHER PUBLICATIONS

Chinese Office Action (OA) issued Apr. 21, 2014 in corresponding Chinese Patent Application No. 201280019550.7.
Japanese Office Action (OA) issued Nov. 13, 2012 in corresponding Japanese Patent Application No. 2011-94727 (now patented as No. 5232266).
International Search Report (ISR) issued May 22, 2012 in International (PCT) Application No. PCT/JP2012/060351.
Written Opinion issued May 22, 2012 in International (PCT) Application No. PCT/JP2012/060351.

* cited by examiner

POWER PRICE
(YEN / kWh)

FIG.5
SUMMERTIME (COMMERCIAL CHARGE 23:00-5:00)
| ▨ PV ELECTRIC POWER SELLING AMOUNT | ▩ PV SELF CONSUMPTION | ▧ SECONDARY BATTERY CHARGE | ▨ STORAGE DISCHARGE | ▨ POWER PURCHASE (IN-HOME CONSUMPTION) |
(a) DISCHARGE START 7:00 2.0kW    ELECTRIC POWER CHARGE 29 YEN/DAY
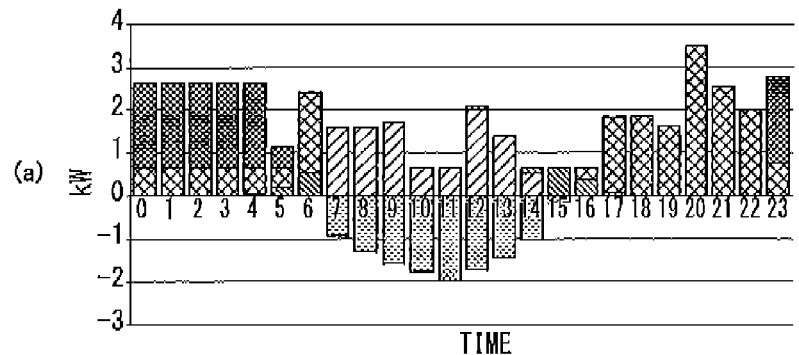
(b) DISCHARGE START 8:00 2.0kW    ELECTRIC POWER CHARGE 37 YEN/DAY
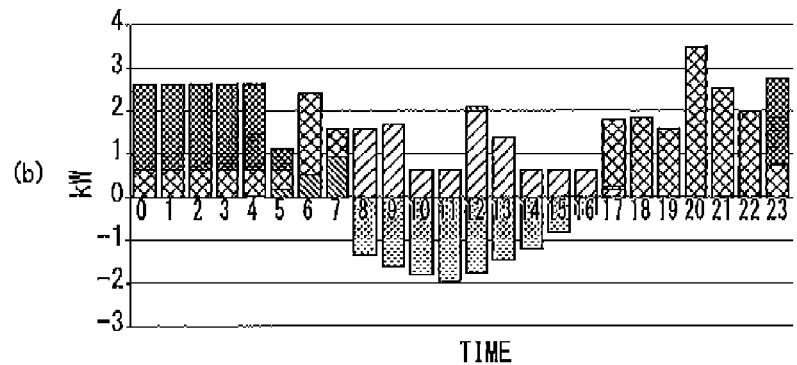
(c) DISCHARGE START 9:00 2.0kW    ELECTRIC POWER CHARGE 33 YEN/DAY
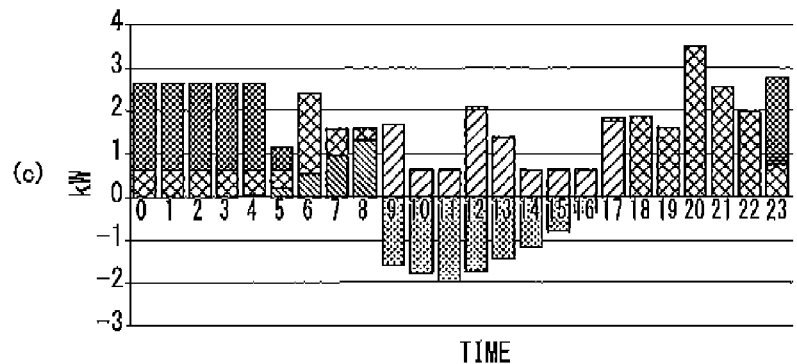

FIG.7
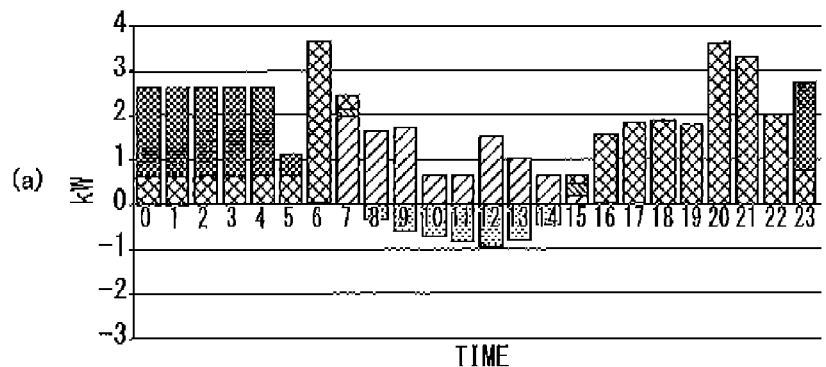
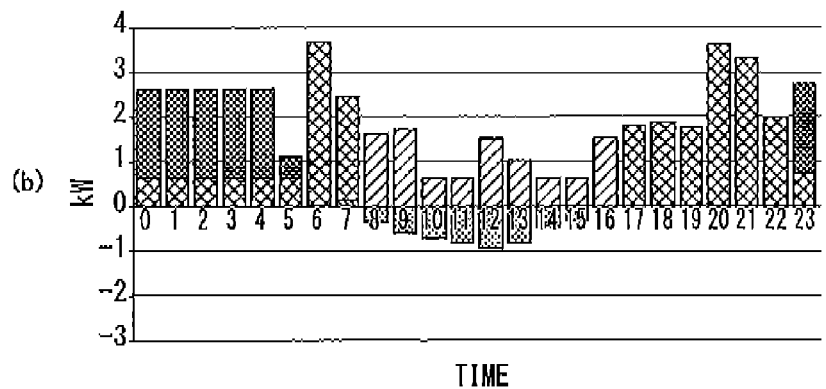
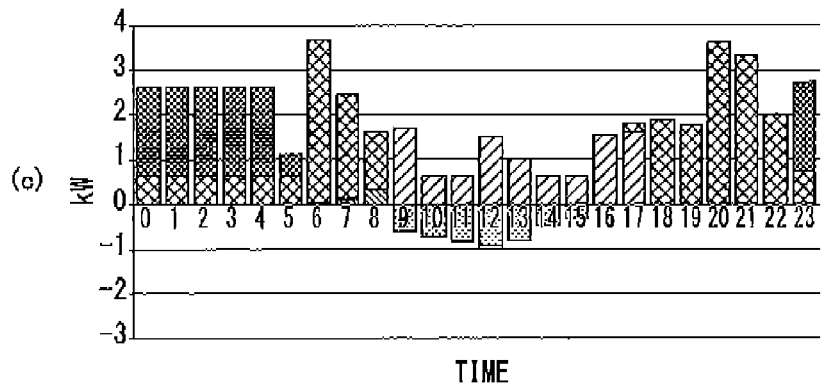

FIG.8
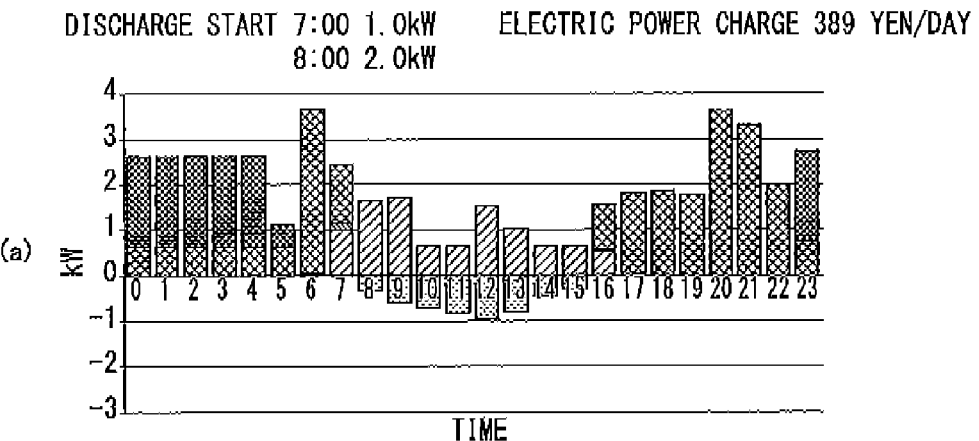
(a)
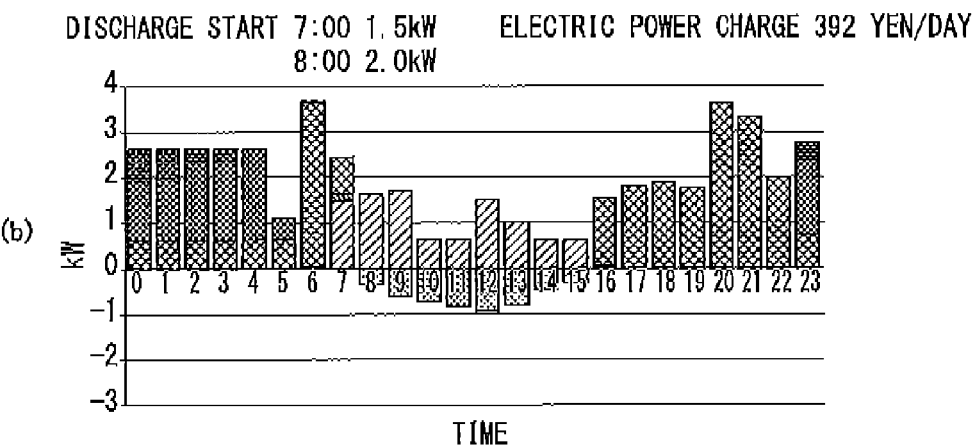
(b)
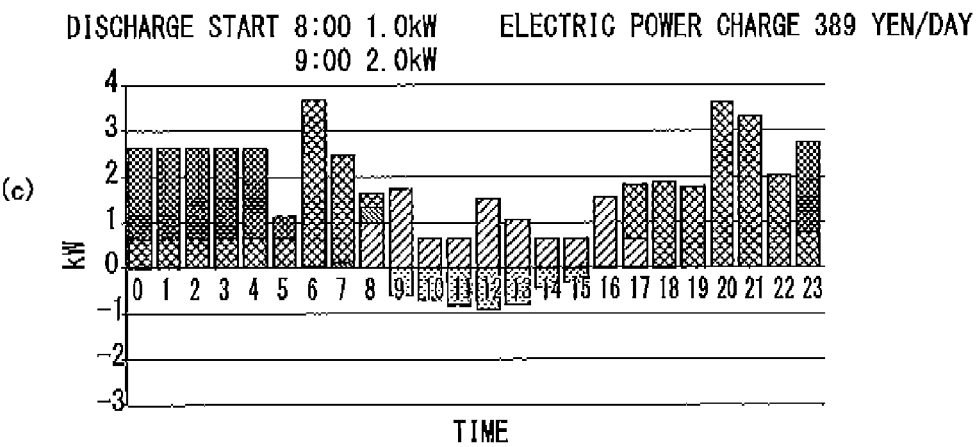
(c)

POWER CONTROL SYSTEM

TECHNICAL FIELD

The present invention relates to a power control system which controls the optimal distribution of power to be supplied from a solar power generator, power storage device, and system power network in a building including a solar power generator and a power storage device.

DESCRIPTION OF THE RELATED ART

Control which reduces an electric power charge or levels electric power load aimed at a house including a solar power generator and a power storage device is conventionally known (refer to, for example, Patent Documents 1-3).

Patent Document 1 (JP H11-178237A) discloses a power supply system which uses power generated by a solar power generator, power obtained from a system power network during a time period except for late-evening, and late-evening power in ascending order according to price, so as to reduce an electric power charge.

Patent Document 2 (JP 2004-32989A) discloses a method of calculating the capacity of a secondary battery for obtaining the optimal combination of a solar power generator and a power storage device. This document compares a case in which the power of the power storage device is preferentially used with a case in which the power generated by the solar power generator is preferentially used.

Patent Document 3 (JP 2008-54439A) discloses a power system in which an electric vehicle including a power storage device and a house including a solar power generator are connected. This power system is configured to measure various power data with a power sensor, and classify and study external factor data such as weather or schedules of a resident, so as to predict future power demand or power generation amount based on the results.

RELATED ART DOCUMENT

Patent Document

PATENT DOCUMENT 1: JP H11-178237A
PATENT DOCUMENT 2: JP 2004-32989A
PATENT DOCUMENT 3: JP 2008-54439A

SUMMARY OF THE INVENTION

Problem to be Solved by the Invention

However, the power supply system of Patent Document 1 is a system which determines power to be used after determining circumstances at the time, and does not always perform the optimal control when calculating for several days.

The method of calculating the capacity of a secondary battery in Patent Document 2 calculates the most suitable capacity of a power storage device at the time of introducing an installation based on past measurement or estimation. However, it cannot deal with a change after the introduction, such as a change in power price, a change in lifestyle, or generation of shade due to a neighboring building. Patent Document 2 discloses consideration of whether or not a power storage device is preferentially used, but does not compare merits by changing the magnitude of output of the power storage device.

The power system disclosed in Patent Document 3 selects, based on predicted values of future power demand, power generation amount, or the like, the most appropriate control relative to the predicted values. However, the selected control is not the most appropriate control if it falls short of prediction.

It is, therefore, an object of the present invention to provide a power control system which evaluates an applied control pattern for a period of a predetermined length or more so as to be used in the subsequent control with a configuration which can change a magnitude of output and discharge start time of a power storage device.

Means for Solving Problem

To attain the above object, a power control system of the present invention for a building including a solar power generator and a power storage device includes initial setting means for setting a calculation condition required for control of the solar power generator and the power storage device; measurement means for measuring a power generation amount of the solar power generator and a power consumption of the building; power price-setting means for setting a power price which changes in accordance with a time and a purchase price that an electric power company pays to purchase the power generated by the solar power generator; control pattern storage means for storing a plurality of control patterns with a discharge start time of the power storage device as a variable factor; calculation period-setting means for setting a past calculation period which is a standard for calculating an electric power charge of the building; electric power charge calculation, means for calculating each electric power charge by performing simulation based on each of the control patterns with a past measurement value measured by the measurement means and the power price set by the power price-setting means for the building in the calculation period; control pattern selection means for selecting one control pattern by evaluating a calculation value calculated by the electric power charge calculation means with a predetermined standard; and a controller which performs control after the calculation in accordance with the control pattern selected by the control pattern selection means.

In this case, a control pattern in which a magnitude of output of the power storage device is a variable factor can be stored in the control pattern storage means. It is preferable for a plurality of control patterns to include control patterns in which the discharge start time of the power storage device is changed per unit time.

Effect of the Invention

The power control system of the present invention having the above configuration is configured to actually measure the power generation amount and power consumption of a building having a solar power generator and a power storage device, and to perform simulation of an electric power charge with the measurement values for a plurality of control patterns. A plurality of control patterns to be simulated includes a discharge start time of the electric storage device as a variable factor, and the subsequent control pattern is determined based on the calculation results.

With this configuration, the applied control pattern can be re-evaluated by changing the discharge start time of the electric storage device. As a result, the subsequent control can be performed based on the highly-evaluated control. Namely, the most appropriate control pattern at the time can be found from the control patterns in which the discharge start time is changed by using the actual measurement value without changing an installation such as the capacity of the electric storage device.

The most appropriate control pattern can be found from various control patterns by setting not only the discharge start time but also the magnitude of the output of the power storage device to a variable factor.

BRIEF DESCRIPTION OF THE DRAWINGS

FIG. 5 is a graph illustrating results of simulation in summertime when discharging the rated output from the discharge start as the upper limit.

FIG. 7 is a graph illustrating results of simulation in wintertime when discharging the rated output from the discharge start as the upper limit.

FIG. 8 is a graph illustrating results of simulation in wintertime when controlling the output in the discharge start.

DESCRIPTION OF EMBODIMENT

Figure 1:
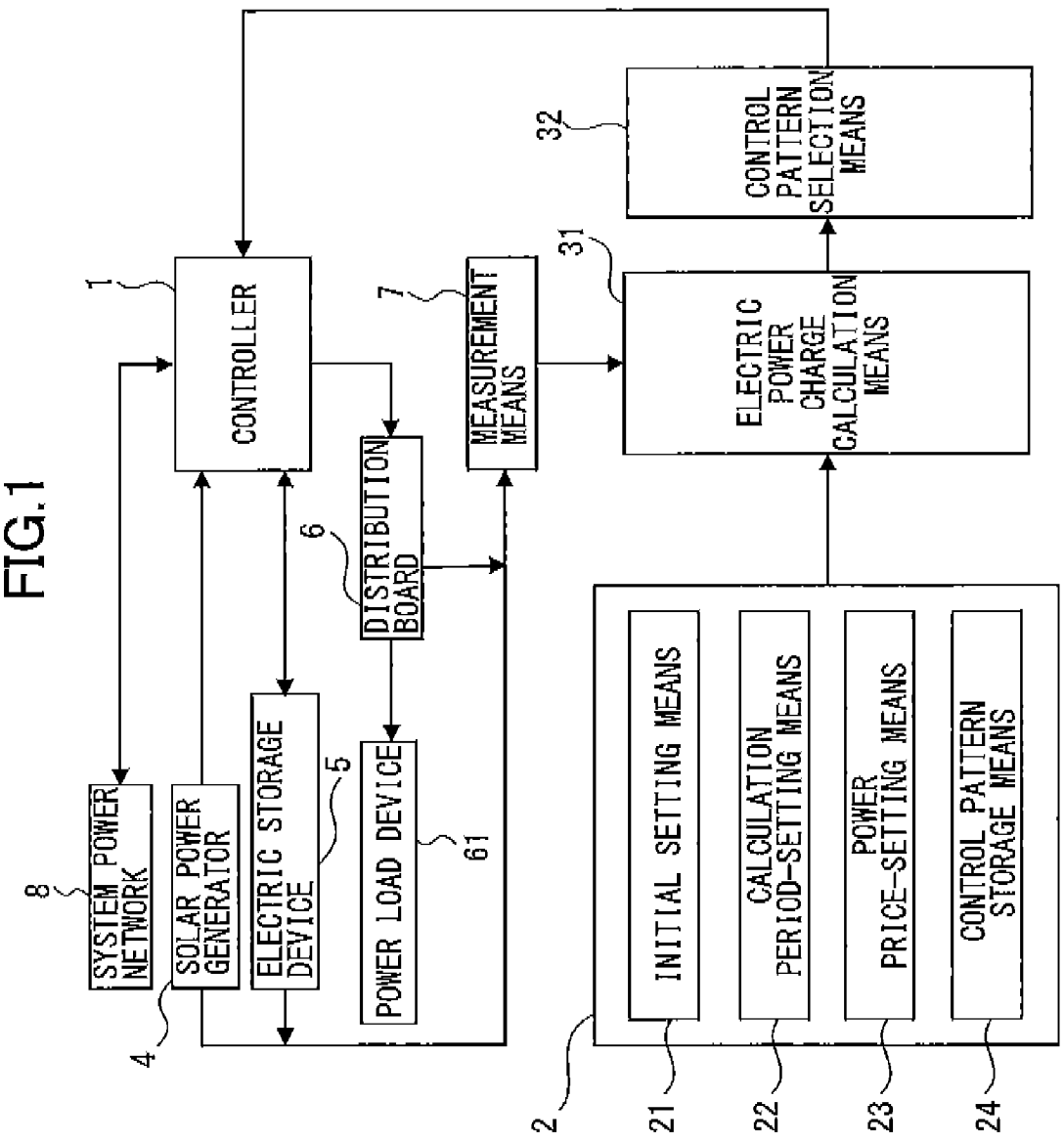
FIG. 1 is a block diagram describing a configuration of a power control system according to an embodiment of the present invention.

Hereinafter, an embodiment of the present invention will be described with reference to the drawings. FIG. 1 is a block diagram describing a general configuration of a power control system according to the embodiment of the present invention. At first, the entire configuration of the power control system will be described with reference to FIG. 1.

A house as a building, which is controlled by the power control system, is connected to a system power network 8 as a power network which receives the supply of power from system power such as cogeneration equipment set up in each area or an electric generation plant of an electric power company.

The house includes a solar power generator 4 as a distributed power generation device and a power storage device 5 which temporally stores power.

The solar power generator 4 is configured to generate power by directly converting solar light as solar energy into power with a solar battery. The solar power generator 4 is able to supply power only in a solar light-receivable time.

DC power generated by the solar power generator 4 is generally converted into AC power by a not shown power conditioner, so as to be used. The conversion between DC power and AC power is performed when charging the power in the power storage device 5 or discharging the power from the power storage device 5.

When a part of or the entire after-described power load device 61 operates by direct current, the power generated by the solar power generator 4 or the power discharged from the power storage device 5 can, be directly used as direct current.

Various power load devices 61 to which power is supplied through a power distribution board 6 are installed in a house. The power load devices 61 which operate by power include, for example, an air conditioner, an illumination device such as an illumination stand or a ceiling light, and a home electrical appliance such as a refrigerator or a TV.

When an electric vehicle or a plug-in hybrid car is charged for traveling, it becomes the power load device 61. When the electric vehicle or plug-in hybrid car is discharged for the power load device 61 of a house, it becomes the power storage device 5.

The power control system of the present embodiment includes a setting unit 2 which performs various settings for control, measurement means 7 which measures power consumption of a house and power generation amount of the solar power generator 4, electric power charge calculation means 31 which calculates an electric power charge after controlling power with the after-described plurality of control patterns, control pattern selection means 32 which selects one control pattern by evaluating the calculation results of the electric power charge calculation means 31 with a predetermined standard, and a controller 1 which controls the solar power generator 4 or the power storage device 5 in accordance with the selected control pattern.

The setting unit 2 includes initial setting means 21 which sets a calculation condition required for the control of the power storage device 5 and the solar power generator 4, calculation period-setting means 22 which sets a past certain period as a calculation period for calculating an electric power charge of a house, power price-setting means 23 which sets a power price and a purchase price, and control pattern storage means 24 which stores a plurality of control patterns for controlling the power storage device 5 and the solar power generator 4.

The initial setting means 21 sets the power generation capacity of the solar power generator 4 set up in a house, and the storage capacity and the rated output of the power storage device 5. The calculation period-setting means 22 sets a past calculation target period. The calculation period can be set to about 15-60 days, preferably, about 15-30 days.

The power price-setting means 23 sets a power price (purchase price for resident) which changes depending on a time in a day. The power price-setting means 23 sets, for example, a rate-evening discount price from 23:00 (a1) to before 7:00 (a2), a living time price from 7:00 (a2) to before 10:00 (a3), a daytime price from 10:00 (a3) to before 17:00 (a4), and a living time price from 17:00 (a4) to before 23:00 (a1).

The power price-setting means 23 sets a purchase price (electric power selling price for resident) that an electric power company or the like pays to purchase the power generated by the solar power generator 4. When an electric power company purchases the reduction of the emission of carbon oxide, the power price-setting means 23 also sets the price of the emission.

Figure 3:
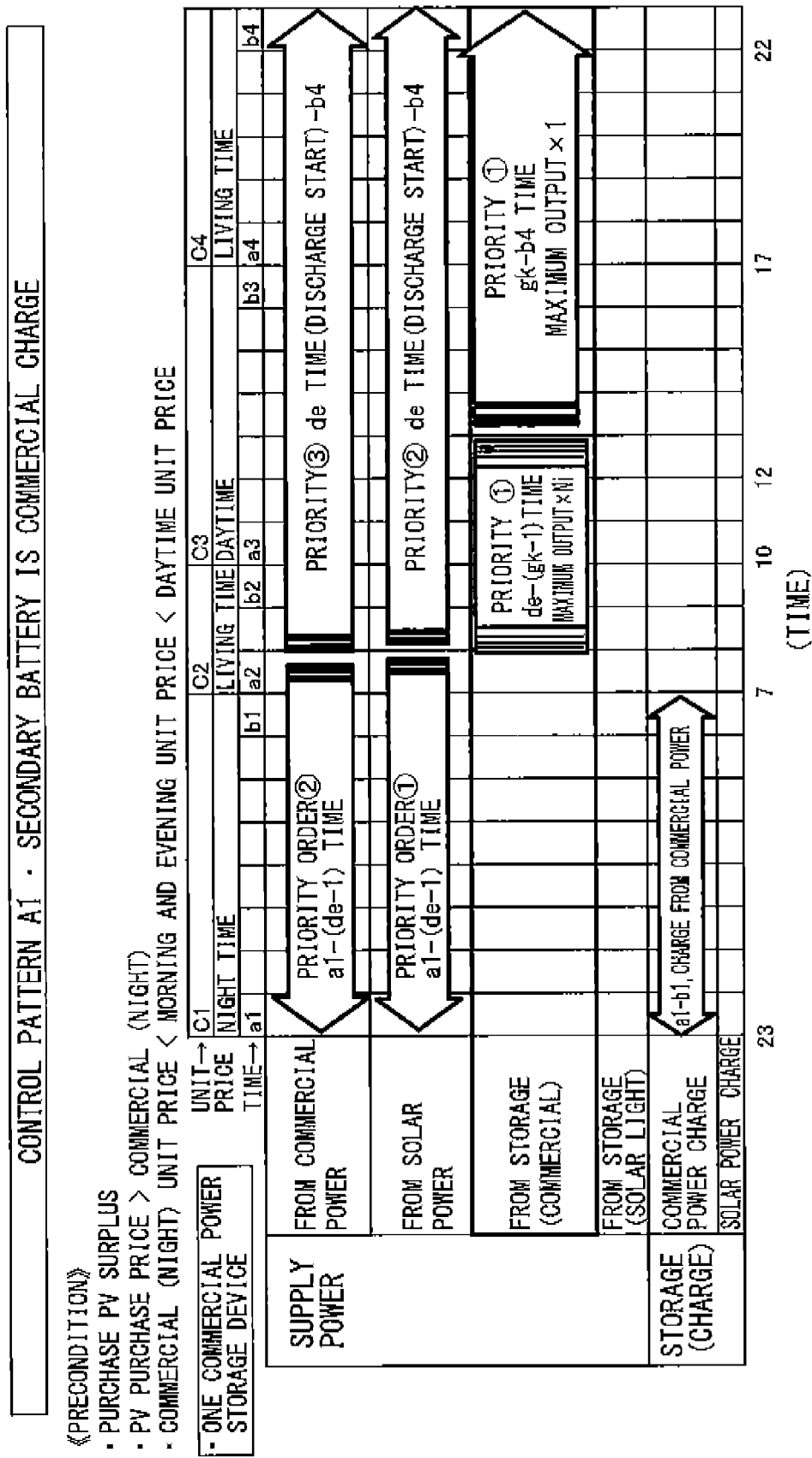
FIG. 3 is an illustration describing a control pattern A1.

The control pattern, storage means 24 stores a plurality of control patterns regarding a power supply method or a power usage method such as charging timing. FIG. 3 illustrates a control pattern A1 which is a standard in the description of the present embodiment.

In the control pattern A1, as a precondition, when the power generated by the solar power generator (PV) 4 has a surplus which is not consumed in a house, the surplus flows toward the system power network 8 as reverse power flow so as to be purchased by an electric power company. The purchase price in this case is set to be higher than the late-evening discount price. The living time price is set to be higher than the late-evening discount price, and the daytime price is higher than the living time price. The power storage device 5 is able to charge power which flows from the system power network 8.

The electric power charge reduction effect by the purchasing of the surplus of the solar power generator 4 and the effect of effective use of the low-priced late-evening power are expected by the control of the control pattern A1. The power storage device 5 is therefore charged by the power from the system power network 8 in the time zone of the late-evening discount price.

In the control pattern A1, the power supply to a house is distributed in the following order of priority. At first, in the time zone of the late-evening discount price (from time a1 to before time a2) and from the time b1 to the time (de−1), the power generated by the solar power generator 4 is preferentially used, and the power of the system power network 8 is supplied when there is not enough power. In this case, the time de is a time which is set between the time a2 and the time b3. A plurality of control patterns can be obtained in the control pattern A1 by changing the time de.

The power is supplied to a house in order of the discharge from the power storage device 5, the power generated by the solar power generator 4, and the power supplied from the system power network 8 from the time de to before the time a1.

The magnitude (upper limit) of the output of the power storage device 5 can be changed. For example, the discharge amount (output) of the power storage device 5 can be changed per time by setting a value in which the rated output of the power storage device 5 is integrated with the ratio Ni ($0<Ni\leq1$) as the upper limit output.

For example, a control pattern, which discharges the output of the power storage device 5 while controlling the output from the time de to the time (gk−1), and discharges the rated output from the time gk to before the time a1, can be obtained. Namely, the control pattern which controls the output of the power storage device 5 just after the start of the discharge, and increases the output thereafter can be prepared.

The time gk is a time which is set between the time a2 and the time b3. A plurality of control patterns can be obtained in the control pattern A1 by changing the time gk. In addition, when Ni=1, the upper limit output of the power storage device 5 from the time de to before the time a1 is the same.

A plurality of control patterns can be obtained by setting the time de and the time gk, and the ratio Ni of the output of the power storage device 5 to a variable number (flexible factor) in the control pattern A1. For example, a control pattern in which the discharge start time of the power storage device 5 is changed with respect to a unit time can be obtained.

In the electric power charge calculation means 31, the electric power charge is calculated for a plurality of control patterns stored in the control pattern storage means 24. The electric power charge is calculated for a calculation period set by the calculation period-setting means 22.

The power generation amount and the electric power selling amount (reverse power flow amount) of the solar power generator 4, and the power consumption, of a house in the calculation period use a measurement value measured in the past measurement period, by the measurement means 7. For example, the measurement value measured for n days before the same date last year can be used. In this case, the actual measurement value can be directly used, but an average value at each time of a day calculated from the measurement valued for n clays can be used.

The control pattern having the lowest electric power charge among the electric power charges calculated for a plurality of the control patterns is selected by the control pattern selection means 32. Namely, the evaluation standard of the control pattern described in the present embodiment is based on a low price.

The controller 1 performs control in accordance with one control pattern selected by the control pattern, selection means 32. In this case, the controller 1 is connected to the power storage device 5, solar power generator 4, and distribution board 6 connected to the system power network 8 and the power load device 61.

The controller 1 includes a power conditioner which controls the charging and discharging timing of the power storage device 5. The controller 1 controls the power discharged from the power storage device 5 so as to flow the power toward the distribution board 6. The controller 1 also controls the power generated by the solar power generator 4 so as to flow the power in the distribution board 6 or reversely flow the power in the system power network 8. The controller 1 also controls the power of the system power network 8 so as to flow the power in the power storage device 5 or so as to flow the power in the distribution board 6.

Figure 2:
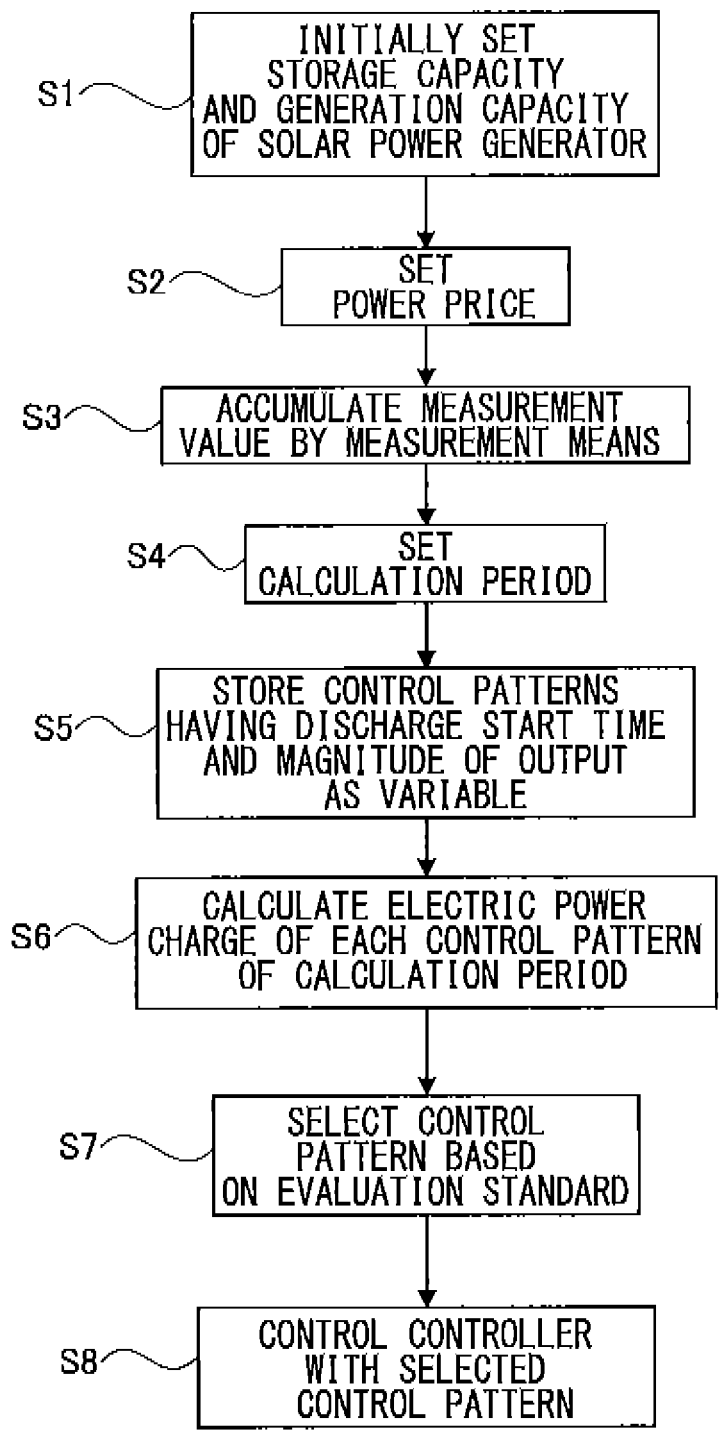
FIG. 2 is a flowchart describing flow of a process of the electric control system according to the embodiment of the present invention.

Next, the flow of the process of the power control system of the present embodiment will be described with reference to FIG. 2.

At first, the power generation capacity (kW) of the solar power generator 4, and the storage capacity (kW) and the rated output of the power storage device 5 are input by the initial setting means 21 (step S1). This input is performed with a not-shown monitor installed in a house or a not-shown terminal connected to a system. The specifications of the solar power generator 4 and the power storage device 5 connected to the system can be automatically detected.

Next, the power price and the purchase price in the calculation are set by the power price-setting means 23 (step S2). More specifically, the power control system of the present embodiment performs the calculation by using the power consumption of a house actually measured by the measurement means 7. However, prices which are applied to a desired evaluation period of a control pattern can be used as a power price and a purchase price to be set without using the prices in the measurement.

Such prices can be set from a terminal, or can be extracted from a not-shown database connected to the system. The prices can be automatically updated by connecting to a server of an electric power company.

As a precondition for the calculation, the power generation amount and the electric power selling amount of the solar power generator 4, and the power consumption of a house for at least a calculation period are measured by the measurement means 7, so as to accumulate the measurement values (step S3).

The calculation period is set by the calculation period-setting means 22 (step S4). For example, n-days (15-60 days) until yesterday or n-days before the same date last year can be set as the calculation period.

A plurality of control patterns having the discharge start time and the magnitude (upper limit output) of the output of the power storage device 5 as variable numbers (flexible factor) is stored in the control pattern storage means 24 (step S5). This control pattern can be set from a terminal or can be automatically set based on the study from the operation or the assistance from another performance.

Next, the electric power charge of the set each control pattern is calculated by the electric power charge calculation means 31 (Step S6). The control pattern having the lowest electric power charge is extracted from the control patterns having the calculated electric power charge by the control pattern selection means 32 (Step S7).

After the calculation, the control based on the selected control pattern having the lowest electric power charge is performed by the controller 1 (step S8). This control pattern can be re-examined every day, or can be re-examined per period which is similar to the calculation period.

Next, the function of the power control system of the present embodiment will be described.

The power control system of the present embodiment is configured to actually measure the power generation amount and the power consumption of a house including the solar power generator 4 and the power storage device 5 for a predetermined period or more, and perform simulation of an electric power charge with the measurement values for a plurality of control patterns. In this case, a plurality of control patters to be simulated uses the discharge start time and the magnitude of the output of the power storage device 5 as variable factors.

The applied control pattern can be re-evaluated by changing the discharge start time and the magnitude of the output of the power storage device 5. As a result, the subsequent control can be performed based on the highly-evaluated control. More specifically, the most suitable control pattern at that time can be found among the control patterns in which the discharge start time and the magnitude of the output are changed by using the actual measurement values without changing installation such as the capacity of the power storage device 5.

The applied control pattern can be re-evaluated over a relatively-long period such as 15-60 days, so that the subsequent control can be performed based on the highly-evaluated control.

The control selected once is performed for a certain period of time, so that the evaluation on a long clock based on the actual operation results can be performed when re-evaluating the control pattern selected thereafter.

The evaluation can be appropriately re-performed by using the actual measurement value, so that the power control system can easily deal with change in a power price, a change in installation such as the power storage device 5 or the solar power generator 4, a change in a life style, or a change such as occurrence of shade due to a neighboring building.

Example

Next, the results of the simulation based on the control pattern A1 described in the above embodiment will be described with reference to FIGS. 4-10. In addition, the same reference numbers are applied to portions which are the same as or similar to the portions described in the above embodiment.

Figure 4:
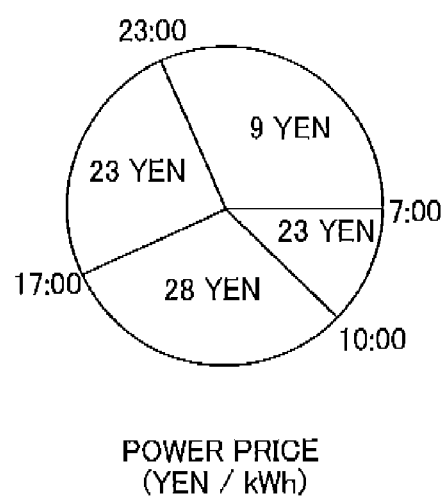
FIG. 4 is an illustration describing power prices for simulation in an example.

The power price is set as illustrated in FIG. 4 by the power price-setting means 23 for the simulation of this example (purchase price for resident). Namely, the late-evening discount price from 23:00 (a1) to before 7:00 (a2) is set to 9 yen/kWh, the living time price from 7:00 (a2) to before 10:00 (a3) is set to 23 yen/kWh, the daytime price from 10:00 (a3) to before 17:00 (a4) is set to 28 yen/kWh, and the living time price from 17:00 (a4) to before 23:00 (a1) is set to 23 yen/kWh.

The purchase price (electric power selling price for resident) that an electric power company pays to purchase power generated by the solar power generator 4 is set to 39 yen/kWh. The precondition of the control pattern A1 in which the power purchase price is higher than the late-evening discount price, the living time price is higher than the late-evening discount price, and the daytime price is higher than the living time price is therefore satisfied.

Figure 9:
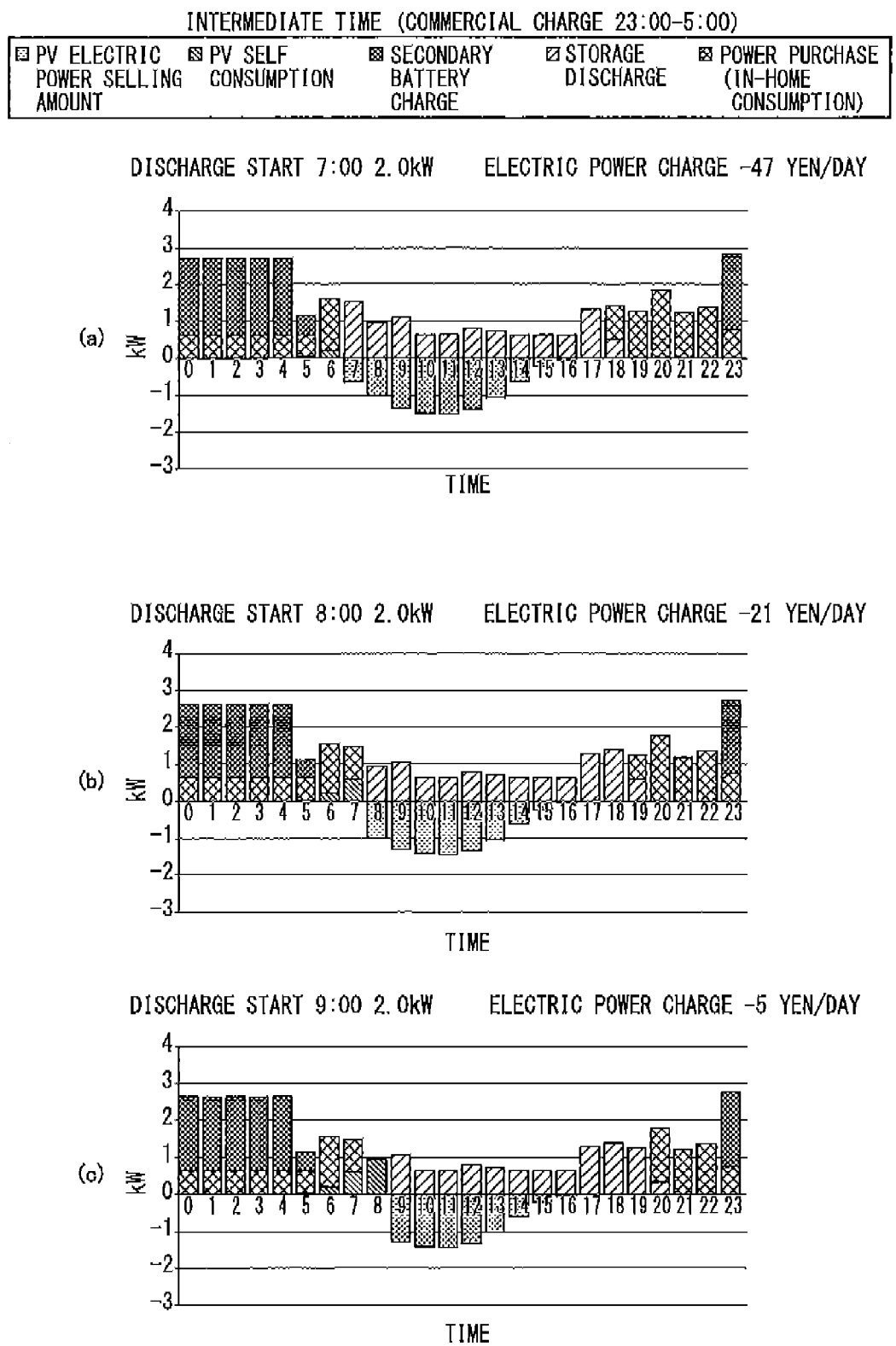
FIG. 9 is a graph illustrating results of simulation in intermediate time when discharging the rated output from the discharge start as the upper limit.

In this example, simulation in which the calculation period is set to 30 days is performed in each of summertime, wintertime, and intermediate time between the summertime and wintertime. At first, as illustrated in FIGS. 5, 7, 9, the control patterns in which the discharge start time (time dc) of the power storage device 5 is shifted by one hour between 7:00 and 9:00 are prepared in each season. Each of the control patterns outputs the rated output (2.0 kW) from the discharge start as the upper limit.

Figure 6:
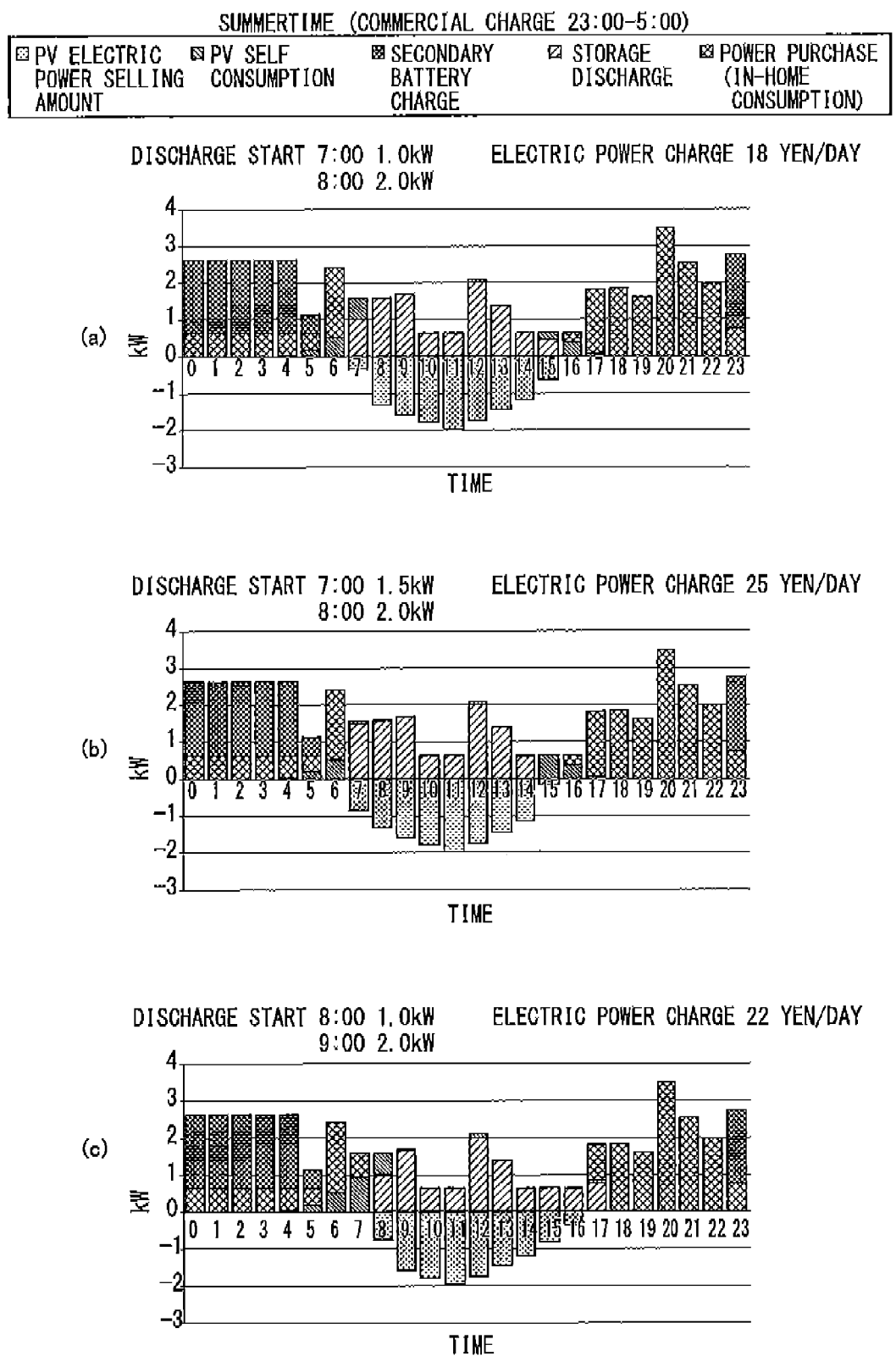
FIG. 6 is a graph illustrating results of simulation in summertime when controlling the output in the discharge start.
Figure 10:
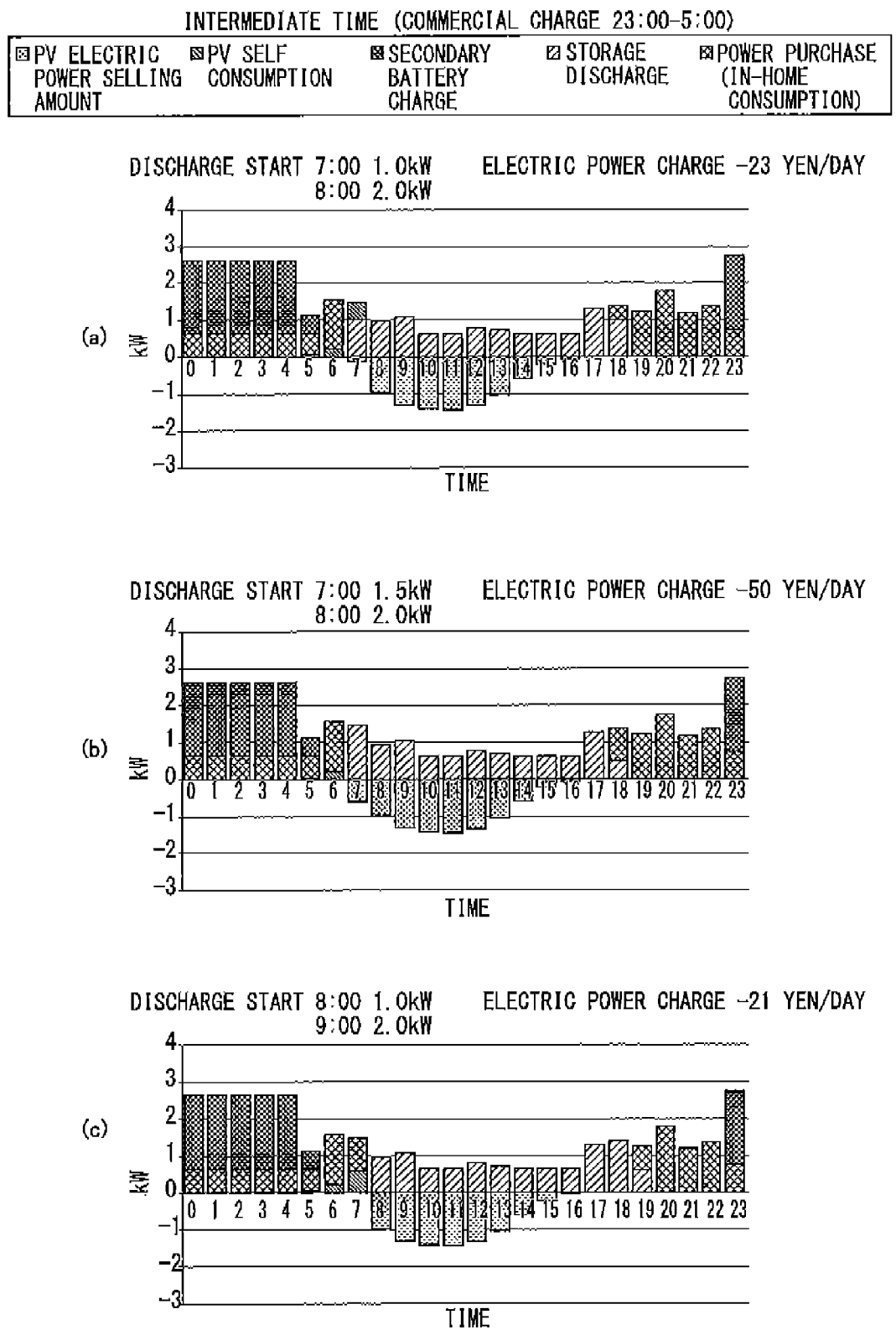
FIG. 10 is a graph illustrating results of simulation in intermediate time when controlling the output in the discharge start.

Moreover, as illustrated in FIGS. 6, 8, 10, the control patterns which control the output of the power storage device 5 for one hour after the discharge start are prepared in each season. In each of these control patterns, the upper limit output of the power storage device 5 is controlled to 1.0 kW or 1.5 kW for one hour after the discharge start, and then the rated output (2.0 kW) is thereafter output as the upper limit.

Next, with reference to FIGS. 5, 6, the simulation results of six control patterns in summertime will be described. As illustrated in FIG. 5, the electric power charge per day when the output of the power storage device 5 is not controlled is 29 yen/day with the control pattern in which the discharge start time is 7:00, 37 yen/day with the control pattern in which the discharge start time is 8:00, and 33 yen/day with the control pattern in which the discharge start time is 9:00. On the other hand, as illustrated in FIG. 6, the electric power charge per day when the output of the power storage device 5 is controlled for one hour after the discharge start is 18 yen/day with the control pattern in which the discharge start time is 7:00 and the upper limit output for the first one hour is controlled to 1.0 kW, 25 yen/day with the control pattern in which the discharge start time is 7:00 and the upper limit output for the first one hour is controlled to 1.5 kW, and 22 yen/day with the control pattern in which the discharge start time is 8:00 and the upper limit output for the first one hour is controlled to 1.0 kW.

Comparing these six control patterns in summertime, the control pattern as illustrated in FIG. 6(a) in which the discharge start time is 7:00, the upper limit output of the power storage device 5 from 7:00 to 8:00 is controlled to 1.0 kW, and the upper limit output is increased to 2.0 kW (rated output) from 8:00 obtains the lowest electric power charge.

On the other hand, in wintertime, as illustrated in FIG. 7, the electric power charge per day when the output of the power storage device 5 is not controlled is 389 yen/day with the control pattern in which the discharge start time is 7:00, 374 yen/day with the control pattern in which the discharge start time is 8:00, and 389 yen/day with the control pattern in which the discharge start time is 9:00. As illustrated in FIG. 8, the electric power charge per day when the output of the electric power charge 5 is controlled for one hour after the discharge start is 389 yen/day with the control pattern in which the discharge start time is 7:00 and the upper limit output for the first one hour is controlled to 1.0 kW, 392 yen/day with the control pattern in which the discharge start time is 7:00 and the upper limit output for the first one hour is controlled to 1.5 kW, and 389 yen/day with the control pattern in which the discharge start time is 8:00 and the upper limit output for the first one hour is 1.0 kW.

Comparing these six control patterns in wintertime, the control pattern illustrated in FIG. 7(b) in which the discharge start time is 8:00 and the rated output (2.0 kW) is set to the upper limit without controlling the output after the discharge start obtains the lowest electric power charge.

Moreover, in intermediate time, as illustrated in FIG. 9, the electric power charge per day when the output of the power storage device 5 is not controlled is −47 yen/day with the control pattern in which the discharge start time is 7:00, −21 yen/day with the control pattern in which the discharge start time is 8:00, and −5 yen/day with the control pattern in which the discharge start time is 9:00. In addition, "−" (minus) means no payment of an electric power charge, and indicates profits for a resident.

As illustrated in FIG. 10, the electric power charge per day when the output of the power storage device 5 is controlled for one hour after the discharge start is −23 yen/day with the control pattern in which the discharge start time is 7:00 and the upper limit output for the first one hour is controlled to 1.0 kW, −50 yen/day with the control pattern in which the discharge start time is 7:00 and the upper limit output for the first one hour is controlled to 1.5 kW, and −21 yen/day with the control pattern in which the discharge start time is 8:00 and the upper limit output for the first one hour is controlled to 1.0 kW.

Comparing these six control patterns in intermediate time, the control pattern as illustrated in FIG. 10(b) in which the discharge start time is 7:00 and the upper limit output of the power storage device 5 from 7:00 to 8:00 is controlled to 1.5 kW, and the upper limit output is increased to 2.0 kW (rated output) from 8:00 obtains 50 yen profit per day, and the lowest electric power charge.

It can be deduced from the above description that the electric power charge to be calculated is changed by changing the discharge start time and the magnitude of the output of the power storage device 5 even if the other calculation conditions are the same. In the simulation of this example, the calculation period is set to 30 days. By performing the calculation for a relatively long period of time, economical control for practical use, which is different from control with an instantaneous value, can be obtained.

The other configurations and effects of this example are substantially similar to those in the embodiment; thus, the description thereof will be omitted.

Although the embodiment of the present invention has been described above, the present invention is not limited thereto. It should be appreciated that variations may be made in the embodiment described by persons skilled in the art without departing from the scope of the present invention.

For example, in the above embodiment, the solar power generator 4 is only used as a distributed power generator; however, a power control system for a house including a small power generator with a fuel battery or fossil fuel can be used.

The power price and purchase price described in the above embodiment and example are only examples, and the time in which the power price is changed and the number of time zones having different prices are changed based on a business policy of an electric power company.

The controller 1 described in the above embodiment is connected to the solar power generator 4, power storage device 5, system power network 8, and distribution board 6. However, it is not limited thereto, and for example, a power conditioner which is disposed between the power storage device 5 and the distribution board 6 can be a controller.

In the above embodiment and example, a plurality of control patterns in which the discharge start time and the output of the power storage device 5 are changed based on the control pattern A1 is prepared. However, it is not limited thereto, and the basic control pattern can be changed. Control patterns in which the discharge start time of the power storage device 5 is only changed can be stored in the control pattern, storage means 24.

In the above embodiment and example, the low electric power charge is only used as the evaluation standard of the control pattern. However, it is not limited thereto, and other elements such as the emission amount of carbon dioxide can be added to the evaluation standard.

CROSS-REFERENCE TO RELATED APPLICATION

The present application is based on and claims priority from Japanese Patent Application No. 2011-094727, filed on Apr. 21, 2011, the disclosure of which is hereby incorporated by reference in its entirety.

The invention claimed is:

1. A power control system for a building including a solar power generator and a power storage device, comprising:
   initial setting means for setting a calculation condition required for control of the solar power generator and the power storage device;
   measurement means for measuring a power generation amount of the solar power generator and a power consumption of the building;
   power price-setting means for setting a power price which changes in accordance with a time and a purchase price that an electric power company pays to purchase the power generated by the solar power generator;
   control pattern storage means for storing a plurality of control patterns with a discharge start time of the power storage device as a variable factor;
   calculation period-setting means for setting a past calculation period which is a standard for calculating an electric power charge of the building;
   electric power charge calculation means for calculating each electric power charge by performing simulation based on each of the control patterns with a past measurement value measured by the measurement means and the power price set by the power price-setting means for the building in the calculation period;
   control pattern selection means for selecting one control pattern by evaluating a calculation value calculated by the electric power charge calculation means with a predetermined standard; and
   a controller which performs control after the calculation in accordance with the control pattern selected by the control pattern selection means.

2. The power control system according to claim 1, wherein the control pattern storage means stores the control pattern with a magnitude of output of the power storage device as a variable factor.

3. The power control system according to claim 1, wherein the plurality of control patterns includes a control pattern in which a discharge start time of the power storage device is changed per unit time.

4. The power control system according to claim 2, wherein the magnitude of the output of the power storage device is changed with respect to each time.

5. The power control system according to claim 4, wherein the plurality of control patterns includes a control pattern which controls the output of the power storage device just after the discharge start, and increases the output thereafter.

6. The power control system according to claim 1, wherein the calculation period is a length of 15-60 days.

7. The power control system according to claim 1, wherein the control pattern selection means evaluates based on a low electric power charge calculated by the electric power charge calculation means.

8. The power control system according to claim 1, wherein the control pattern is selected by the control pattern selection means at constant period intervals by the control pattern selection means.

9. The power control system according to claim 1, wherein the control pattern is selected by the control pattern selection means at intervals having a length which is the same as the calculation period.

10. The power control system according to claim 2, wherein the plurality of control patterns includes a control pattern in which a discharge start time of the power storage device is changed per unit time.

11. The power control system according to claim 2, wherein the calculation period is a length of 15-60 days.

12. The power control system according to claim 3, wherein the calculation period is a length of 15-60 days.

13. The power control system according to claim 4, wherein the calculation period is a length of 15-60 days.

14. The power control system according to claim 5, wherein the calculation period is a length of 15-60 days.

15. The power control system according to claim 10, wherein the calculation period is a length of 15-60 days.

16. The power control system according to claim 2, wherein the control pattern selection means evaluates based on a low electric power charge calculated by the electric power charge calculation means.

17. The power control system according to claim 3, wherein the control pattern selection means evaluates based on a low electric power charge calculated by the electric power charge calculation means.

18. The power control system according to claim 10, wherein the control pattern selection means evaluates based on a low electric power charge calculated by the electric power charge calculation means.

19. The power control system according to claim 2, wherein the control pattern is selected by the control pattern selection means at constant period intervals by the control pattern selection means.

20. The power control system according to claim 2, wherein the control pattern is selected by the control pattern selection means at intervals having a length which is the same as the calculation period.

* * * * *